United States Patent
Rackow et al.

(10) Patent No.: US 9,415,817 B2
(45) Date of Patent: Aug. 16, 2016

(54) CRAWLER VEHICLE

(71) Applicant: CLAAS INDUSTRIETECHNIK GMBH, Paderborn (DE)

(72) Inventors: Sascha Rackow, Paderborn (DE); Robert Obermeier-Hartmann, Bueren (DE)

(73) Assignee: CLAAS Industrietechnik GmbH, Paderborn (DE)

( * ) Notice: Subject to any disclaimer, the term of this patent is extended or adjusted under 35 U.S.C. 154(b) by 0 days.

(21) Appl. No.: 14/645,625

(22) Filed: Mar. 12, 2015

(65) Prior Publication Data
US 2015/0266524 A1 Sep. 24, 2015

(30) Foreign Application Priority Data

Mar. 20, 2014 (DE) .......................... 10 2014 003 964

(51) Int. Cl.
*B62D 55/06* (2006.01)
*B62D 55/12* (2006.01)
*B62D 55/14* (2006.01)
*B62D 55/30* (2006.01)
*B62D 55/112* (2006.01)

(52) U.S. Cl.
CPC .............. *B62D 55/06* (2013.01); *B62D 55/112* (2013.01); *B62D 55/12* (2013.01); *B62D 55/14* (2013.01); *B62D 55/305* (2013.01)

(58) Field of Classification Search
CPC ...... B62D 55/12; B62D 55/14; B62D 55/112; B62D 55/1125
See application file for complete search history.

(56) References Cited

U.S. PATENT DOCUMENTS

| | | | | |
|---|---|---|---|---|
| 2,442,354 A | † | 6/1948 | Gordon, Jr. | |
| 2,467,947 A | † | 4/1949 | Skelton | |
| 4,202,564 A | * | 5/1980 | Strader | B60G 5/04 280/124.158 |
| 4,519,654 A | * | 5/1985 | Satzler | B62D 55/14 180/9.54 |
| 4,923,257 A | † | 5/1990 | Purcell | |
| 5,452,949 A | † | 9/1995 | Kelderman | |
| 5,566,773 A | † | 10/1996 | Gersmann | |
| 5,622,234 A | * | 4/1997 | Nagorcka | B62D 55/08 180/9.5 |
| RE36,284 E | | 8/1999 | Keldermann | |
| 6,234,590 B1 | * | 5/2001 | Satzler | B62D 55/1086 305/132 |

FOREIGN PATENT DOCUMENTS

| | | |
|---|---|---|
| CA | 2372949 | 8/2003 |
| CA | 2668234 A1 † | 12/2009 |
| CA | 2832180 A1 † | 5/2014 |
| DE | 19919959 | 11/2000 |
| JP | 5-286460 | 11/1993 |
| WO | WO 03/029070 | 4/2003 |
| WO | WO 2006/128284 | 12/2006 |

\* cited by examiner
† cited by third party

*Primary Examiner* — Kevin Hurley
(74) *Attorney, Agent, or Firm* — Michael J. Striker

(57) ABSTRACT

A crawler vehicle has a body and at least one left and one right track roller unit. The track roller units are connected to the body via a machine axis. The track roller units comprise a first and a second guide roller as well as a first and a second supporting arm on which the guide rollers are mounted. The first and the second supporting arms of each roller unit are mounted to be pivotable independently of one another about the machine axis.

9 Claims, 2 Drawing Sheets

CRAWLER VEHICLE

CROSS-REFERENCE TO A RELATED APPLICATION

The invention described and claimed hereinbelow is also described in German Priority Document DE 10 2014 003964.1, filed on Mar. 20, 2014. The German Priority Document, the subject matter of which is incorporated herein by reference, provides the basis for a claim of priority of invention under 35 U.S.C. 119(a)-(d).

BACKGROUND OF THE INVENTION

The invention relates to a crawler vehicle for use in agriculture, such as a tractor, a combine harvester or the like.

Conventional crawler vehicles typically comprise two or four track roller units, which support the body and in each of which a track belt is tensioned between guide rollers. Unlike air-filled tires, the guide rollers are generally not elastically deformable per se. For this reason, an oscillatory connection between the roller unit and the body is particularly significant in a crawler vehicle when the objective is that of preventing or limiting vibrations of the body and optionally, of tools of the agricultural vehicle mounted thereon when traveling over uneven terrain.

An agricultural vehicle comprising track roller units is known, for example, from DE 199 19 959 A1. In this conventional crawler vehicle, two guide rollers of a track roller unit are held by two supporting arms, which are rigidly connected to one another via coupling flanges. The coupling flanges rest against one another and are bolted to one another. A bearing journal oriented transversely to the vehicle, about which the rigidly interconnected supporting arms can pivot, is connected to a second, vertically oriented coupling flange.

When one of the guide rollers passes over a raised area on the ground and the other guide roller non-incidentally simultaneously passes over a depression, the stub axle is moved upward. In order to prevent such an upward motion from being transferred to the body, the connecting flange is not directly connected to the body, but rather is connected in an articulated manner to an anchor plate. The anchor plate is fixed to the body, via a bearing journal that is offset toward the stub axle in the longitudinal direction of the vehicle. Given that the flange pivots about the axis defined by the bearing journal, the flange can yield to the upward motion of the guide roller and the stub axle without transferring this upward motion to the body.

The length of the bearing journal is slight and corresponds to the thickness of the anchor plate and the connecting flange. The weight of the vehicle therefore acts with a very short lever arm on the bores of the anchor plate and the connecting flange, which accommodate the bearing journals, and local forces can occur that are considerably greater than the weight of the vehicle. In order to securely and permanently hold the bearing journal, the anchor plate and the connecting flange must have a considerable wall thickness, which contributes to the weight of the track roller unit.

SUMMARY OF THE INVENTION

The present invention overcomes the shortcomings of known arts, such as those mentioned above.

To that end, the present invention provides a a crawler vehicle having a track roller unit, which has a simple design and is highly loadable while also being lightweight.

In an embodiment, the invention provides a crawler vehicle with a body and at least one left and one right track roller unit. The track roller units are connected to the body via a machine axis and each comprises a first and a second guide roller as well as a first and a second supporting arm, on which the guide rollers are supported. An axis about which the first and the second supporting arms of each roller unit are mounted to be pivotable independently of one another coincides with the machine axis. Since the guide rollers in such a design can move in the vertical direction independently of one another relative to the machine axis, there is no need in this case to support the pivoting center of the supporting arms in the manner known from DE 199 95 9 A1 so as to be movable relative to the body. Hence, the invention makes it possible to simplify the design of the track roller unit and reduce the weight thereof.

The machine axis preferably has a cylindrical axle body, which extends through the bearing bushings of the front and the rear supporting arm. Such an axle body can be rigidly fastened directly on the body, for example, being flange-mounted thereon or the axle body can engage into a recess of the body.

In order to permit the two supporting arms to pivot independently of one another, the bearing bushings thereof enclose the axle body preferably so as to be axially offset relative to one another.

In order to counteract a possible tilting of the bearing bushings on the axle body, each bearing bushing is substantially symmetrical relative to a plane extending through the center points of the two guide rollers in the direction of travel. To this end, at least one of the bearing bushings is divided into two parts in the axial direction such that the other bearing bushing encloses the axle body between the two parts of the one bearing bushing.

In order to distribute the weight of the crawler vehicle evenly onto the ground contact area of a roller belt wrapped around the guide rollers, at least one support roller is disposed between the two guide rollers of one of the track roller units in each case, wherein a bearing of the support roller is held by a control arm connected in an articulated manner to one of the supporting arms.

A hydraulic element is connected in an articulated manner on the one supporting arm and the bearing of the support roller in order to press these against the ground.

In order to achieve an even distribution of the vehicle weight across a long ground contact area, the bearing of the support roller is formed by a frame in which at least one additional support roller is mounted.

In an embodiment, the first supporting arm comprises two sections, which are connected in an articulated manner and a hydraulic element, which is connected in an articulated manner to the two sections in order to vary the axial spacing of the first guide roller from the machine axis. In this manner, tension is maintained in a track belt that is wrapped around the guide rollers.

An additional hydraulic element acts on both supporting arms at a distance from the machine axis in each case, in order to dampen simultaneous, opposed pivot motions of the supporting arms, which occur when the body pivots upward and downward relative to the body.

BRIEF DESCRIPTION OF THE DRAWINGS

Further features and advantages of the invention will become apparent from the description of embodiments that follows, with reference to the attached figures, wherein.

DETAILED DESCRIPTION OF THE INVENTION

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

Figure 1:
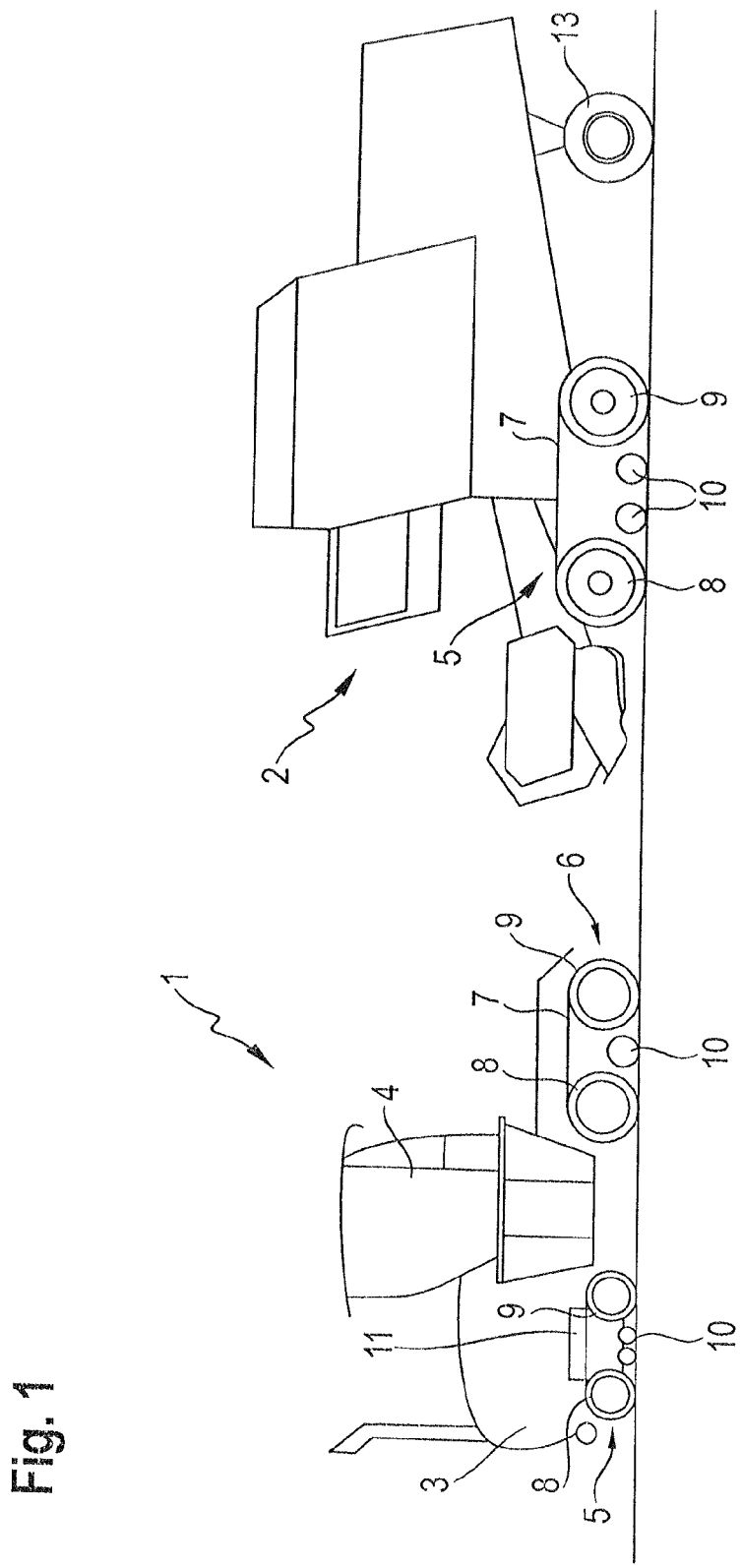
FIG. 1 shows a schematic side view of two crawler vehicles.

FIG. 1 shows a highly schematic side view of two examples of crawler vehicles according to the invention. The inventive crawler vehicle is an agricultural tractor 1 and the second is a combine harvester 2.

In the case of the tractor 1, a body having an engine housing 3 and a driver's cab 4 is supported in the front and the rear by pairs of track roller units 5, 6. Each track roller unit 5 and 6 comprises, in a manner known per se, two guide rollers 8, 9 around which a track belt 7 is wrapped. Support rollers 10 can be disposed between the guide rollers 8, 9 in order to distribute the weight of the vehicle as evenly as possible onto the part of the track belt 7 that rests on the ground between the guide rollers 8, 9.

The two front track roller units 5 are fastened on a fifth wheel 11, which can rotate about a vertical axis relative to the body.

The rear track roller units 6 are rigidly connected here to the body; however, a fifth wheel could be provided here as well in order to improve the maneuverability of the vehicle and to permit travel in the crab-steering mode.

According to alternative embodiments, on a steerable axle, the fifth wheel 11 can be replaced by an Ackermann steering system, which permits rotation of the two track roller units 5 or 6, which together form a steerable axle, about different axles on the left and the right side of the body, respectively.

According to a further modification, the pair of track roller units can be replaced by conventional wheels 13 equipped with pneumatic tires on one of the two axles of the tractor 1, preferably the lesser loaded one thereof, as shown for the combine harvester 2. When such wheels 13 are present, these expediently form a steerable axle of the vehicle; a steerable connection of the track roller units with the body, e.g., via the aforementioned fifth wheel 11, is not necessary in this case.

Figure 2:
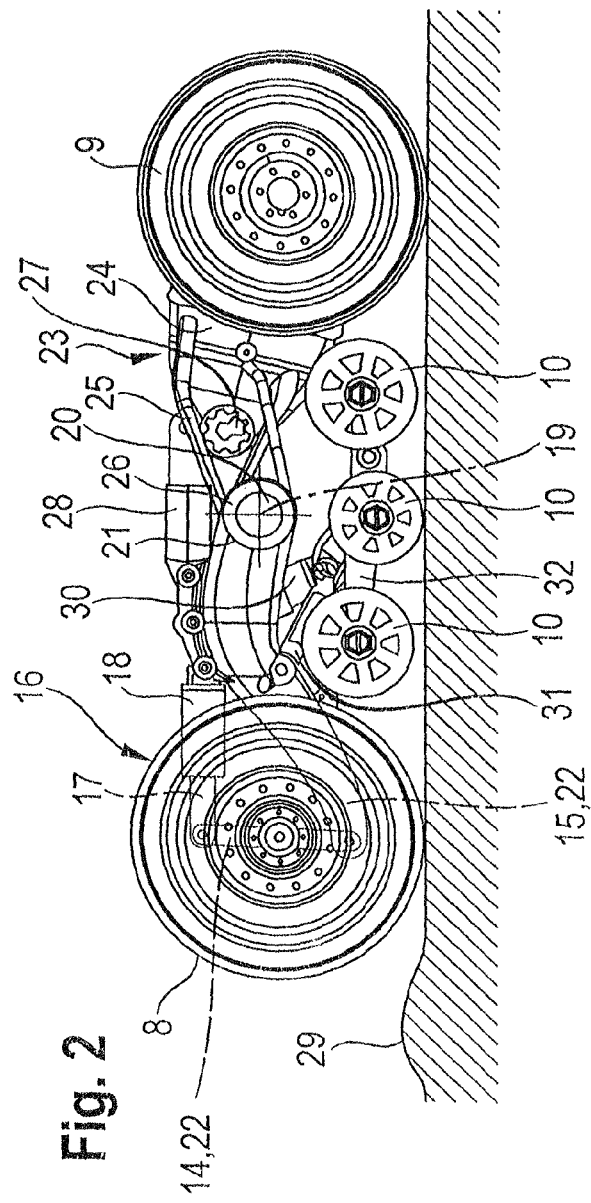
FIG. 2 shows a side view of a track roller unit, which can be used on the vehicles shown in FIG. 1.
Figure 3:
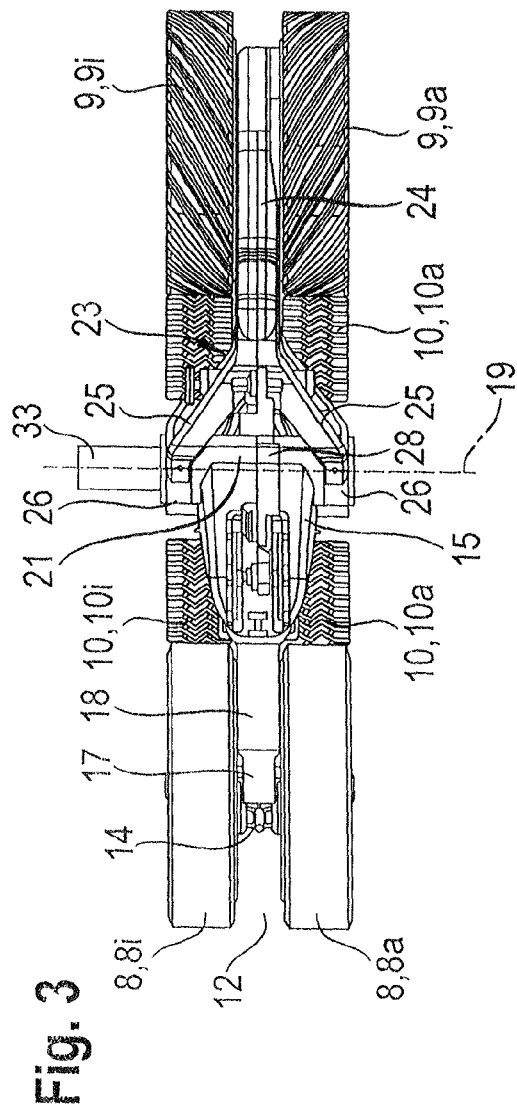
FIG. 3 shows a top view of the track roller unit from FIG. 2.

A track roller unit, which can be used on a vehicle according to the invention, is shown in a side view in FIG. 2 and in a top view in FIG. 3. In the following it is assumed that the track roller unit that is shown is the front track roller unit 5 that is present in both vehicles 1 and 2, although it is understood that the rear track roller unit 6 of the tractor 1 can be designed accordingly.

The track belt 7, which wraps around the guide rollers 8, 9 and is pressed against the ground by the support rollers 10, is omitted in FIGS. 2 and 3. In the top view of FIG. 3, it is evident that the guide rollers 8, 9 and support rollers 10 each comprise an inner roller body 8$i$, 9$i$ and 10$i$, respectively, on an inner side of the track roller unit 5 facing the body and an outer roller body 8$a$, 9$a$ and 10$a$, respectively, on an outer side, which are separated from one another by an intermediate space 12.

An axle of the front guide roller 8 is held by a control arm 14, which is suspended in the intermediate space 12 between the tip of a front rocker arm 15 and the piston rod 17 of a hydraulic element 16, the cylinder 18 of which also is connected to the front rocker arm 15. It is therefore possible to adjust the axial spacing of the guide roller 8 from a machine axis 19 by retracting or extending the piston rod 17. The machine axis is formed here by the axis of a cylindrical axle body 20.

The axle body 20 extends perpendicularly to the plane of the drawing of FIG. 2 and is enclosed by a bearing bushing 21 formed on the rear end of the rocker arm 15. The control arm 14 and the front rocker arm 15 thereby form an adjustable-length, front supporting arm 22, which pivotably connects the guide roller 8 to the axle body 20 so as to be pivotable about the axis 19 thereof.

A rear supporting arm 23 is approximately Y-shaped in the top view of FIG. 3, having a leg 24 engaging into the intermediate space 12 between the roller bodies 9$i$, 9$a$ of the rear guide roller 9 and two legs 25, which diverge toward the front and each form, at the front ends thereof, a part of a bearing bushing 26 enclosing the axle body 20 on both sides of the bearing bushing 21.

A gearbox is housed in the leg 24 of the rear supporting arm 23, which receives torque for driving the track belt 7 from an engine of the vehicle via a non-illustrated shaft acting on a coupling flange 27 and transfers said torque to the guide roller 9. The shaft is suspended in an adjustable-length and universally-jointed manner in order to allow oscillating motions of the guide roller 9 and the supporting arm 23 about the machine axis defined by the axle body 20 to be followed.

A second hydraulic element 28 extends above the axle body 20 and acts on the front rocker arm 15 and the rear supporting arm 23.

The second hydraulic element 28 is compressed and expanded in a damped, elastic manner and thereby makes it possible, during forward travel (toward the left in FIGS. 2 and 3), for the guide roller 8 and the guide roller 9 to deflect upwardly, one after the other, accompanied by compression of the element 28, when passing over a raised area in the ground without immediately carrying the axle body 20 along therewith. Shock absorption for uneven terrain is therefore provided.

A third hydraulic element 30 is connected to the front rocker arm 15 and to a rear, lower end of a control arm 31, the front top end of which is connected to the rocker arm 15, or to a frame 32. Frame 32 is connected in an articulated manner to the control arm 31 and on which the support rollers 10 are mounted. The hydraulic element 30 is compressed and expanded in a damped, elastic manner in order to allow the support rollers 10 to undergo an evasive motion when the support rollers roll over the raised area in the ground 29. The pivotable connection of the frame 32 to the control arm 31 ensures that at least two of the support rollers 10 transfer the weight of the vehicle onto the ground at any given time.

In the illustration of FIG. 3, the axle body 20 overhangs on the side of the track roller unit 5 facing the body. The overhanging section 33 of the axle body 20 can be inserted into a corresponding recess of the body (or a fifth wheel 11, if present) and anchored therein. Since the section 33 extends in a straight extension of the axle body 20 along the machine axis—in particular, said section can extend said axle body as one piece—no torque occurs that is oriented in the direction of the machine axle, which could induce rotation of the axle body 20 when the axle body 20 is loaded with the weight of the vehicle after the section 33 is inserted into the recess of the body or the fifth wheel.

The occurrence of a torque in the axle body 20 that is oriented in the longitudinal direction of the vehicle is unavoidable when the axle body is exposed to the weight of the vehicle. In order to ensure that the axle body 20 does not yield to this torque, the walls of the recess must fixedly hold the section 33 with an equivalent, opposing torque. Since the section 33 may have a considerable length, however, the forces that act between the section 33 and the walls of the recess can be kept low, which makes it possible to keep the wall thicknesses of the interconnected parts of the track roller unit and the body low and reduce the weight of the vehicle.

REFERENCE CHARACTERS

1 tractor
2 combine harvester
3 enging housing
4 driver's cab
5 track roller unit
6 track roller unit
7 track belt
8 guide roller
8a, 8i roller body
9 guide roller
9a, 9i roller body
10 support roller
10a, 10i roller body
11 fifth wheel
12 intermediate space
13 wheel
14 control arm
15 rocker arm
16 hydraulic element
17 piston rod
18 cylinder
19 machine axis
20 axle body
21 bearing bushing
22 front supporting arm
23 rear supporting arm
24 leg
25 leg
26 bearing bushing
27 coupling flange
28 hydraulic element
29 raised area on ground
30 hydraulic element
31 control arm
32 frame
33 section As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A crawler vehicle, comprising:
a body; and
at least one left and one right track roller unit, which are connected to the body via a machine axis;
wherein each track roller unit comprises first and second guide rollers and first and second supporting arms on which the first and second guide rollers are supported;
wherein a track belt is wrapped around the first and second guide rollers and tensioned therebetween; and
wherein the first and the second supporting arms of each track roller unit are mounted about a pivot axis to be pivotable independently of one another, which pivot axis coincides with the machine axis.

2. The crawler vehicle according to claim 1, wherein the machine axis has a cylindrical axle body that extends through bearing bushings of the first and the second supporting arms.

3. The crawler vehicle according to claim 2, wherein the bearing bushings of the first and the second supporting arms enclose the cylindrical axle body so as to be axially offset relative to one another.

4. The crawler vehicle according to claim 2, wherein at least one of the bearing bushings is divided into two parts in an axial direction and another of the bearing bushings encloses the axle body between the two parts of the one bearing bushing.

5. The crawler vehicle according to claim 1, wherein at least one support roller is disposed between the first and the second guide rollers of one of the track roller units and wherein a bearing of the at least one support roller is held by a control arm, which is connected in an articulated manner to one of the first and the second supporting arms.

6. The crawler vehicle according to claim 5, wherein a hydraulic element is connected in an articulated manner to the one of the first and the second supporting arms and the bearing of the at least one support roller.

7. The crawler vehicle according to claim 5, wherein the bearing of the support roller is formed by a frame in which at least one further support roller is mounted.

8. The crawler vehicle according to claim 1, wherein the first supporting arm of the first and the second supporting arms comprises two sections that are interconnected in an articulated manner and wherein a hydraulic element is connected in an articulated manner to the two sections in order to vary an axial spacing of the first guide roller of the first and second guide rollers from the machine axis.

9. The crawler vehicle according to claim 1, wherein a hydraulic element acts on both of the first and the second supporting arms at a distance from the machine axis in each case.

* * * * *